United States Patent [19]
Yamashita

[11] Patent Number: 5,925,482
[45] Date of Patent: Jul. 20, 1999

[54] NON-AQUEOUS BATTERY

[75] Inventor: Masaya Yamashita, Tokyo, Japan

[73] Assignee: Asahi Kasei Kogyo Kabushiki Kaisha, Osaka, Japan

[21] Appl. No.: 08/875,378

[22] PCT Filed: Jan. 25, 1996

[86] PCT No.: PCT/JP96/00132

§ 371 Date: Oct. 15, 1997

§ 102(e) Date: Oct. 15, 1997

[87] PCT Pub. No.: WO96/23324

PCT Pub. Date: Aug. 1, 1996

[30] Foreign Application Priority Data

Jan. 27, 1995 [JP] Japan ................................. 7-011292

[51] Int. Cl.$^6$ .................................................. H01M 2/18
[52] U.S. Cl. .............................. 429/130; 429/94; 429/164
[58] Field of Search ................................ 429/94, 130, 164

[56] References Cited

U.S. PATENT DOCUMENTS

| | | | |
|---|---|---|---|
| 2,542,094 | 2/1951 | Richardson et al. | 429/164 |
| 5,047,068 | 9/1991 | Stoklosa | 429/94 X |
| 5,443,925 | 8/1995 | Machida et al. | 429/94 |
| 5,445,906 | 8/1995 | Hobson et al. | 429/94 X |
| 5,747,188 | 5/1998 | Von Sacken et al. | 429/94 X |

FOREIGN PATENT DOCUMENTS

| | | |
|---|---|---|
| 63-112767 | 7/1988 | Japan . |
| 4-332481 | 11/1992 | Japan . |
| 5-314967 | 11/1993 | Japan . |

*Primary Examiner*—Stephen Kalafut
*Attorney, Agent, or Firm*—Birch, Stewart, Kolasch & Birch, LLP

[57] ABSTRACT

The present invention provides a non-aqueous battery having a unit cell laminate, which comprises a positive plate with an active material of positive electrode only on a single face of a collector foil, a negative plate with an active material of negative electrode only on a single face of a collector foil, and a separator, arranged in a battery casing, wherein the single face of the positive plate with the active material of positive electrode and the single face of the negative plate with the active material of negative electrode are arranged to face each other across the separator, and the other face of the positive plate without the active material of positive electrode and the other face of the negative plate with the active material of negative electrode are arranged to face each other across an insulating film. The structure of the present invention can effectively prevent an abrupt increase in internal temperature even when a short circuit occurs between an active material of positive electrode and a negative electrode due to external application of an abnormal heat, a crush of the battery in a heaping direction, or a pierced nail, thereby ensuring the safety of the battery.

20 Claims, 11 Drawing Sheets

NON-AQUEOUS BATTERY

TECHNICAL FIELD

The present invention relates to a non-aqueous battery. More particularly, it relates to a non-aqueous battery having a specific structure to ensure safety.

BACKGROUND ART

Lithium-ion secondary batteries using a non-aqueous electrolytic solution have recently been adopted as a power source of portable electronic appliances because of their high voltage, high capacity, high output, and light weight. The lithium-ion secondary battery generally has a laminate of electrode plates prepared by winding a positive plate and a negative plate in a spiral form across a porous resin membrane having fine pores and functioning as a separator. The laminate of electrode plates is arranged in a cylindrical attery casing of stainless steel working as a negative electrode. The positive plate is an aluminum foil collector plate, on which an active material of positive electrode containing a lithium-containing composite oxide (for example, $LiCoO_2$) is applied. The negative plate is a copper foil collector plate, on which an active material of negative electrode containing carbon is applied.

Commercially available lithium-ion secondary batteries include the laminate of electrode plates, which may have the structure obtained by laying one positive plate with active material films applied on both faces of an aluminum foil, one negative plate with active material films on both faces of a copper foil, and two separators one upon another in the sequence of the negative plate, one separator, the positive plate, and the other separator and winding the layers in a spiral form to arrange the negative plate as the outer layer. The laminate of electrode plates may alternatively have the structure obtained by laying one negative plate with active material films on both faces of a copper foil, one separator, two positive plates with an active material film on each one face of aluminum foils (wherein two aluminum foils are laid one upon the other to make the active material films exposed to the outside), nd the other separator one upon another in this sequence and winding the layers in a spiral form to arrange the negative plate as the outer layer.

Such lithium-ion secondary batteries conventionally have a safety valve, a temperature fuse, a PTC element, and the like, in order to ensure the safety in case that an abnormality in the circuit or wrong use causes a short circuit of the positive electrode and the negative electrode in the battery and thereby increases the internal temperature of the battery. A further safety measure is required to provide for a variety of working environments and unexpected accidents.

An abrupt internal temperature increase is occasionally observed, for example, in case that a sharp conductive member, such as a nail, is pierced into the battery casing in an over charging state, in case that an abnormal heat is externally applied to the battery, or in case that the battery is crushed in the heaping direction of the laminate of electrode plates.

In these cases, a short circuit apparently occurs between the positive electrode and the negative electrode in the battery. The reason of the abrupt internal temperature increase has so far, however, not been elucidated. The present inventors have found the reason of this phenomenon and completed the present invention.

In case that a nail or another sharp conductive member is pierced into the battery, the point of the nail becomes a negative electrode when passing through the battery casing functioning as the negative electrode, and comes into contact with the internal positive plate. This causes a short circuit across the nail. In case that an abnormal heat is externally applied to the battery, the separator composed of an organic material is fused first and thereby causes the positive plate and the negative plate insulated from each other by the separator to come into contact with each other and cause a short circuit. In case that the battery is crushed in the heaping direction of the laminate of electrode plates, a large stress is applied to the inner circumference of the laminate of electrode plates and breaks the separator, thereby causing the positive plate and the negative plate to come into contact with each other and cause a short circuit.

The lithium-containing composite oxide (active material of positive electrode) has a relatively high resistance among the constituents of the laminate of electrode plates under the condition of a short circuit. A flow of short-circuiting current accordingly increases the temperature of the lithium-containing composite oxide. The heat caused by the increased temperature accelerates a decomposition reaction of the organic solvent included in the battery. When a short circuit occurs in the battery in the charging state, the lithium-containing composite oxide under the charging condition falls into an unstable state with some release of lithium ions and is thus decomposed by the temperature increase to produce active oxygen. The active oxygen accelerates the reactions on the aluminum foil with the lithium-containing composite oxide applied thereon and in the organic solvent.

An object of the present invention is thus to provide a non-aqueous battery, which effectively prevents a short circuit between an active material of positive electrode and a negative electrode in case that an abnormal heat is externally applied to the battery, in case that a sharp conductive member, such as a nail, is pierced into a battery casing, and in case that the battery is crushed in a heaping direction of a laminate of electrode plates, and even when a short circuit occurs, prevents an increase in temperature of the active material of positive electrode due to the short circuit and thereby ensures the safety.

DISCLOSURE OF THE INVENTION

The present invention provides a non-aqueous battery having a unit cell laminate, which comprises a positive plate with an active material of positive electrode only on a single face of a collector foil, a negative plate with an active material of negative electrode only on a single face of a collector foil, and a separator, arranged in a battery casing, wherein the single face of the positive plate with the active material of positive electrode and the single face of the negative plate with the active material of negative electrode are arranged to face each other across the separator, and the other face of the positive plate without the active material of positive electrode and the other face of the negative plate with the active material of negative electrode are arranged to face each other across an insulating film.

Specific examples include a structure having a laminate of electrode plates obtained by winding a plurality of unit cell laminates across insulating films (spirally-wound type), a structure having a laminate of electrode plates obtained by laying a plurality of unit cell laminates one upon another across insulating films (simple stacked type), and a structure having a laminate of electrode plates obtained by folding a plurality of unit cell laminates laid one upon another across insulating films (zigzag-folded type).

In the structure of the non-aqueous battery of the present invention, the face with the active material of positive electrode and the face with the active material of negative electrode are arranged to face each other across the separator, whereas the other faces of the positive collector foil and the negative collector foil without the active materials are arranged to face each other across the insulating film. When a short circuit occurs between the active material of positive electrode and the negative electrode due to an abnormal heat externally applied, a crush of the battery in the heaping direction, or a pierced nail, a short circuit also takes place between the faces of the positive collector foil and the negative collector foil without the active materials. The resistance of the collector foil is lower than the resistance of the active material of positive electrode, so that the electric current mainly flows through the collector foil having the lower resistance even in the short-circuited portion and less electric current flows through the active material of positive electrode. This structure effectively prevents an abnormal temperature increase of the active material of positive electrode under the condition of a short circuit.

The battery casing may be composed of a material functioning as the negative electrode, a material functioning as the positive electrode, or a non-conductive material working neither the negative electrode nor the positive electrode, such as a resin. In case that the battery casing is composed of a non-conductive material, such as a resin, an external electrode may be disposed on the battery casing. In case that the battery casing works as the negative electrode, it is preferable that the face of the positive plate without the active material is arranged to face the battery casing across the insulating film. In this structure, the point of a pierced nail becomes a negative electrode when passing through the battery casing functioning as the negative electrode, and comes into contact with the internal positive plate to cause a short circuit. In case that a nail is pierced only into a little depth of the battery, however, the point of the nail comes into contact with the collector foil prior to contact with the active material of positive electrode, so that substantially no electric current flows through the active material of positive electrode.

The active materials may be applied wholly or partially on the single faces of the collector foils of the positive plate and the negative plate. The structure with the active materials applied on the whole single faces is, however, preferable because of the ease of manufacture. It is required that no active materials are applied on the other faces and the collector foils are wholly exposed to the outside.

Available collector foils of the positive electrode include metal foils, such as aluminum, titanium, and stainless steel, and an aluminum foil is especially preferable. The thickness of the collector foil of the positive electrode is generally 5 to 100 $\mu$m, preferably 8 to 50 $\mu$m, more preferably 10 to 50 $\mu$m.

Available collector foils of the negative electrode include metal foils, such as copper, nickel, and stainless steel, and copper and stainless steel foils are especially preferable. The thickness of the collector foil of the negative electrode is generally 6 to 50 $\mu$m, preferably 8 to 25 $\mu$m.

The collector foils of the positive electrode and the negative electrode are made of expanded metal or punched metal. Carbon cloth, carbon paper, and other metal-equivalents may also be applicable.

The thickness of the active material layers of the positive electrode and the negative electrode is preferably 30 to 300 $\mu$m, more preferably 70 to 130 $\mu$m.

The active material of positive electrode may be a composite oxide of an alkali metal or an alkaline earth metal, such as Li, Na, or Ca, and a transition metal, such as Co, Ni, Mn, or Fe, or a composite oxide of an alkali metal or an alkaline earth metal, a transition metal, and a non-transition metal.

The active material of negative electrode is carbon particles of, for example, coke, graphite, or non-crystalline carbon and may be in a crushed form, a scale-like form, or a spherical form.

The non-aqueous electrolyte is not restricted, but is, for example, an organic electrolytic solution prepared by dissolving an electrolyte, such as $LiClO_4$, $LiBF_4$, $LiAsF_6$, or $CF_3SO_3Li$ in an organic solvent, such as an ether, a ketone, or a carbonate. A solid electrolyte may be used instead.

The separator is composed of a porous membrane with fine pores having no electron-conductive function but an ion-conductive function and high durability to organic solvents. Examples include fine porous membranes of polyolefin resins, such as polyethylene and polypropylene, and woven and non-woven fabrics of polyolefin porous fibers.

The insulating film may be composed of the same membrane as that of the separator having no electron-conductive function but an ion-conductive function. The insulating film without an ion-conductive function is inexpensive and has higher strength than that of the insulating film with an ion-conductive function, so that even an extremely thin film can possess the required strength. Preferable examples are accordingly synthetic polyolefin resin films having no ion-conductive function nor electron-conductive function but high durability to organic solvents, for example, polyethylene, polypropylene, and ethylene-propylene copolymers.

Compared with the insulating film having the same thickness as that of the separator, the insulating film having the less thickness than that of the separator can increase the total length of the unit cell laminates that can be laid one upon another in the battery casing of a fixed size. It is thus preferable that the insulating film has the less thickness than the thickness of the separator.

It is also preferable that the insulating film has a melting point lower than the melting point of the separator. In case that an abnormal heat is externally applied to the battery, this structure enables the insulating film to be fused prior to the separator. A short circuit accordingly occurs between the positive collector foil and the negative collector foil facing each other across the insulating film, before a short circuit takes place between the active materials of the positive electrode and the negative electrode facing each other across the separator.

The insulating film preferably has the melting point that is 5 to 150° C. lower than the melting point of the separator. When the difference in melting point is less than 5° C., there is a possibility of fusing the separator first due to the temperature distribution generally existing in the battery casing. When the difference is greater than 150° C., on the other hand, the insulating film may be fused in the internal temperature range of the battery in the normal working conditions (−20 to 100° C.)

The spirally-wound type non-aqueous battery is repared, for example, by winding layers of the unit cell laminates and the insulating films in a spiral form with a winding machine. The simple stacked type non-aqueous battery is prepared, for example, by laying a plurality of unit cell laminates one upon another and parallel to one another across the insulating films. The zigzag-folded type non-aqueous battery is prepared, for example, by folding the layers of the unit cell laminates and the insulating films at predetermined widths to be arranged in parallel.

In the spirally-wound type non-aqueous battery, the face of the positive plate without the active material is arranged to face the battery casing across the insulating film by making the positive plate of the unit cell laminate exposed to the outside and arranging the insulating film at least on the outer-most circumference. In the simple stacked type non-aqueous battery, a plurality of unit cell laminates are laid one upon another by making the positive plate and the negative plate opposite to each other across the insulating film, adjusting the positions of the negative plates on the center of the heaping direction, arranging the insulating films at least between both the end faces of each unit cell laminate and the battery casing, and arranging the insulating films between the upper-most face of the laminate of electrode plates and the battery casing and between the lower-most face thereof and the battery casing according to the requirements. In the zigzag-folded type non-aqueous battery, the unit cell laminates are folded in such a manner that enables the positive plate to face the inner face of the battery casing, which is parallel to the folded unit face, and the insulating film is arranged at least between the inner face of the battery casing and the positive plate facing the inner face.

The spirally-wound type battery of the present invention may have a center core on the winding center of the laminate of electrode plates.

Preferable examples of the center core include a columnar body having a cut-out portion on the circumferential surface thereof, a rod member having a continuous recess extending in the circumferential direction on the circumferential surface thereof, and a coiled spring. In case that the battery is crushed in the heaping direction of the laminate of electrode plates (that is, the direction intersecting the axis), a large stress is applied to the inner circumference of the laminate of electrode plates and breaks the separator, thereby causing the positive plate and the negative plate to come into contact with each other and cause a short circuit. At this moment, the center core is also crushed to make the edges of the cut-out portion of the columnar body open outward or to cause the inner circumference of the laminate of electrode plates to be cut into the recess of the rod member or into the clearance between the wires of the coiled spring. The laminate of electrode plates is accordingly broken from the side of the inner circumference. This accelerates the short circuit and expands the range of short circuits, so that less electric current flowing per unit volume of the active material of positive electrode prevents an increase in temperature of the active material of positive electrode.

The columnar body is a hollow tube having both open ends in the axial direction and may have a circular or any other cross section perpendicular to the axial direction. The thickness of the columnar body is not specifically restricted, but is determined according to the area of the cut-out portion in order to enable the columnar body to hold a predetermined strength in a normal condition and to be crushed when a predetermined pressing force is applied in the heaping direction.

The cut-out portion represents a through hole pierced from the outer circumference to the inner circumference of the columnar body. The cut-out portion may extend from one end of the columnar body to the other end in the axial direction, may reach only one end, or may not reach either ends. It is preferable that the columnar body has at least two cut-out portions extending in the axial direction thereof.

Especially, the structure having three cut-out portions extending in the axial direction of the columnar body is preferable since the edges of at least one cut-out portion open outward to securely exert the effects discussed above, even when the crushing force is applied in any heaping direction. In the structure having two cut-out portions, it is preferable to arrange these cut-out portions unsymmetrically across the axis of the columnar body. This structure enables the edges of at least one cut-out portion to open outward and securely exert the effects discussed above, even when the crushing force is applied in any heaping direction.

The cut-out portion preferably extends in the direction intersecting the axial direction of the columnar body. The cut-out portion may perpendicularly or obliquely intersect the axial direction. When the columnar body is a cylinder, the cut-out portion may be formed along the arc of the circular cross section or formed in a spiral form on the circumferential surface thereof. This structure enables the edges of the cut-out portion to open outward and securely exert the effects discussed above, even when the crushing force is applied in any direction intersecting the axis.

The cut-out portion preferably has waved edges. The waved edges imply unevenness having the amplitude with respect to the reference line and may have the shape of triangular waves, square waves, or sine waves. The edges of the cut-out portion crushed and opened outward form a wave-like protrusion. This enables the laminate of electrode plates to be readily broken and well disperses the broken positions.

Examples of the rod member having a continuous recess extending in the circumferential direction on the circumferential surface thereof include rod members having a recess of a predetermined width formed in a spiral form on the circumferential surface thereof, such as a screwed shaft, and rod members having a number of circumferential grooves arranged parallel to the circular cross section over the length thereof.

The rod member may be solid or hollow. The hollow structure is, however, preferable since the gas included in the battery casing is released from the hollow space to the safety valve in case that the internal pressure is increased. In the case of the hollow rod member, the recess should be formed from the outer circumference to the inner circumference of the rod member to a depth that does not pass through the inner circumference.

The greater depth of the recess increases the cut-in degree of the laminate of electrode plates, so that the deeper recess is desirable.

The coiled spring applied for the center core preferably has a pitch greater than the diameter of the wires and keeps a clearance between the adjoining wires under a non-loading condition. It is preferable that the clearance between the adjoining wires of the coiled spring is twice or three times the diameter of the wires.

The cross section of the wires of the coiled spring is not restricted, but may have any shape, for example, circular, rhombus, or polygonal. One example is a coiled spring of wires having the rhombus cross section, wherein a serrated recess is formed on the outer circumferential surface. Even in the coiled spring that does not keep a clearance between the adjoining wires under a non-loading condition, this structure enables the inner circumference of the laminate of electrode plates to be readily cut into the recess when a crushing force is applied.

The material of the center core is not restricted, but stainless steel having the sufficient corrosion resistance and strength is desirable.

BRIEF DESCRIPTION OF THE DRAWINGS

FIG. 6 shows the functions of a center core 3a;

DESCRIPTION OF SYMBOLS

| | |
|---|---|
| 1: Laminate of electrode plates | 2: Battery casing |
| 3: Center core | 3a to 3f: Center core |
| 31: Cut-out portion | 32: Split opening (Cut-out portion) |
| 33a to 33c: Slits (Cut-out portions) | |
| 34a to 34c: Slits (Cut-out portions) | |
| 35: Cut-out portion | 35a: Parallel section (Cut-out portion) |
| 35b: Waved section (Cut-out portion) | 36: Tapered section |
| 37: Cut-out portion | 37a: Parallel section (Cut-out portion) |
| 37b: Parallel section (Cut-out portion) | 37c: Waved section (Cut-out portion) |
| 38: Recess | 4: Unit cell laminate |
| 5: Conductive member | 11: Positive plate |
| 11a: Collector foil of positive electrode | 11b: Active material of positive electrode |
| 12: Negative plate | 12a: Collector foil of negative electrode |
| 12b: Active material of negative electrode | 13: Separator |
| 14: Insulating film | 15: Tab on positive electrode |
| 16: Tab on negative electrode | |

BEST MODES FOR CARRYING OUT THE INVENTION

The following describes some embodiments of the present invention based on the accompanying drawings.

Figure 1:
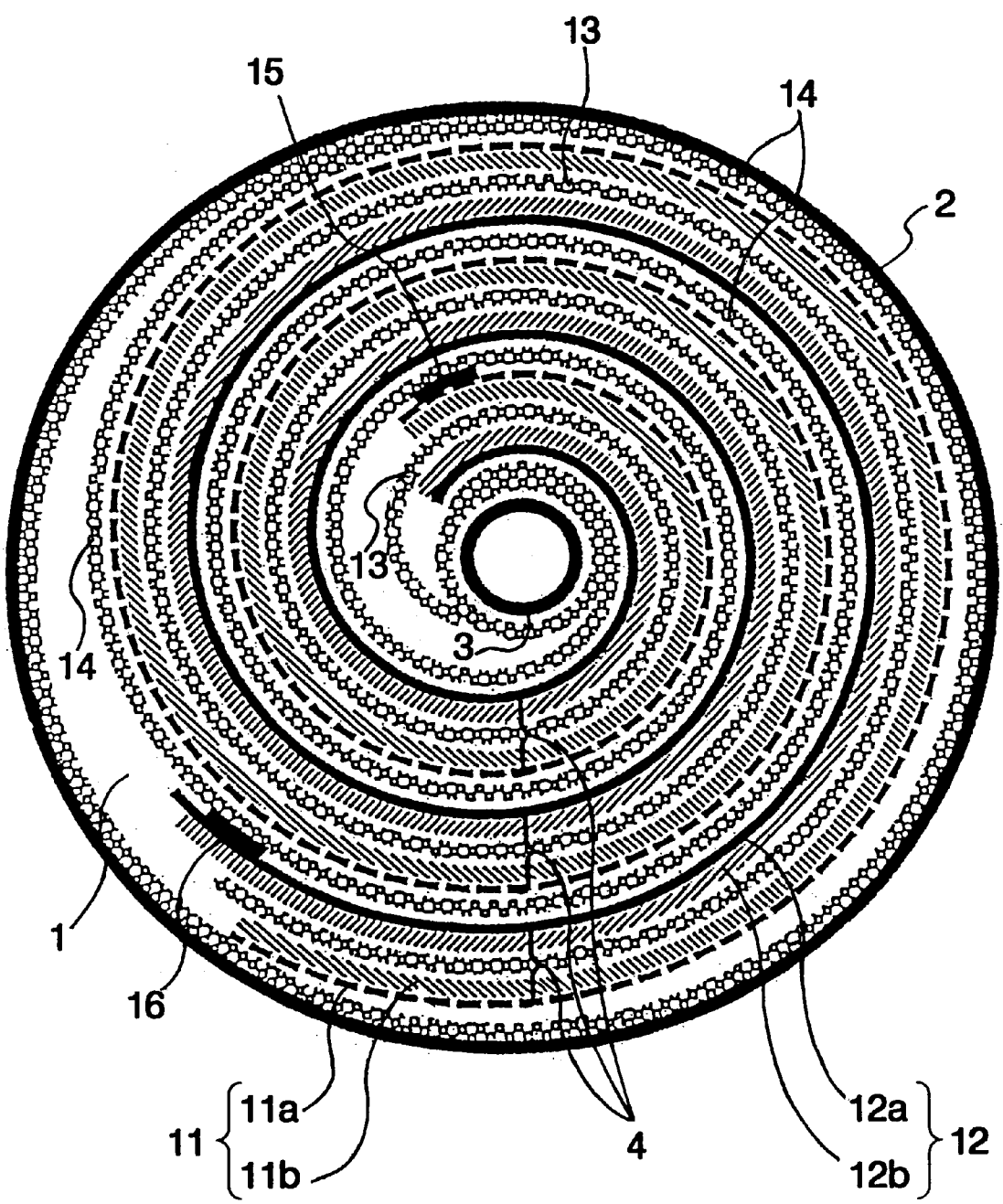
FIG. 1 is a cross sectional view illustrating a non-aqueous battery having a spirally-wound type laminate of electrode plates as a first embodiment according to the present invention.

FIG. 1 is a cross sectional view illustrating a non-aqueous battery having a spirally-wound type laminate of electrode plates as a first embodiment according to the present invention.

The battery is a lithium-ion secondary battery having a spirally-wound type laminate of electrode plates 1 accommodated in a cylindrical battery casing 2. A fine cylindrical center core 3 is inserted into the winding center of the laminate of electrode plates 1. The center core 3 functions as a flow path for leading the gas in the battery casing 2 to the safety valve in case that the internal pressure of the battery casing 2 is increased, and is composed of, for example, stainless steel.

The laminate of electrode plates 1 includes a positive plate 11 having an active material of positive electrode 11b that contains $LiCoO_2$ and is applied only on a single face of an aluminum collector foil 11a, a negative electrode 12 having an active material of negative electrode 12b that contains carbon particles and is applied only on a single face of a copper collector foil 12a, a separator 13 composed of a polyethylene fine porous membrane and arranged between the active material of positive electrode 11b and the active material of negative electrode 12b, and an insulating film 14 composed of the same membrane as that of the separator 13 and arranged between the collector foil 11a of the positive electrode and the collector foil 12a of the negative electrode.

The laminate of electrode plates 1 is obtained by laying the collector foil 11a of the positive electrode, the active material of positive electrode 11b, the separator 13, the active material of negative electrode 12b, the collector foil 12a of the negative electrode, and the insulating film 14 one upon another in this sequence, winding the layers with the insulating film 14 arranged inside (that is, the collector foil 11a of the positive electrode arranged outside) with a winding machine, and further winding the insulating film 14 as an outer-most layer. The laminate of electrode plates 1 accordingly has the layers of the insulating film 14, the collector foil 11a of the positive electrode, the active material 11b of positive electrode, the separator 13, the active material of negative electrode 12b, the collector foil 12a of the negative electrode, the insulating film 14, the collector foil 11a of the positive electrode, and so on, inward from the side of the battery casing 2.

In the laminate of electrode plates 1, the positive electrode 11 and the negative electrode 12 with the active material of positive electrode 11a and the active material of negative electrode 12a arranged to face each other and the separator 13 disposed therebetween constitute a unit cell laminate 4. Whereas the cell reactions proceed in the unit cell laminate 4, no cell reactions occur in the place between the unit cell laminates 4, where the insulating film 14 is disposed (that is, between the collector foils 11a and 12a of the positive electrode and the negative electrode).

Figure 2:
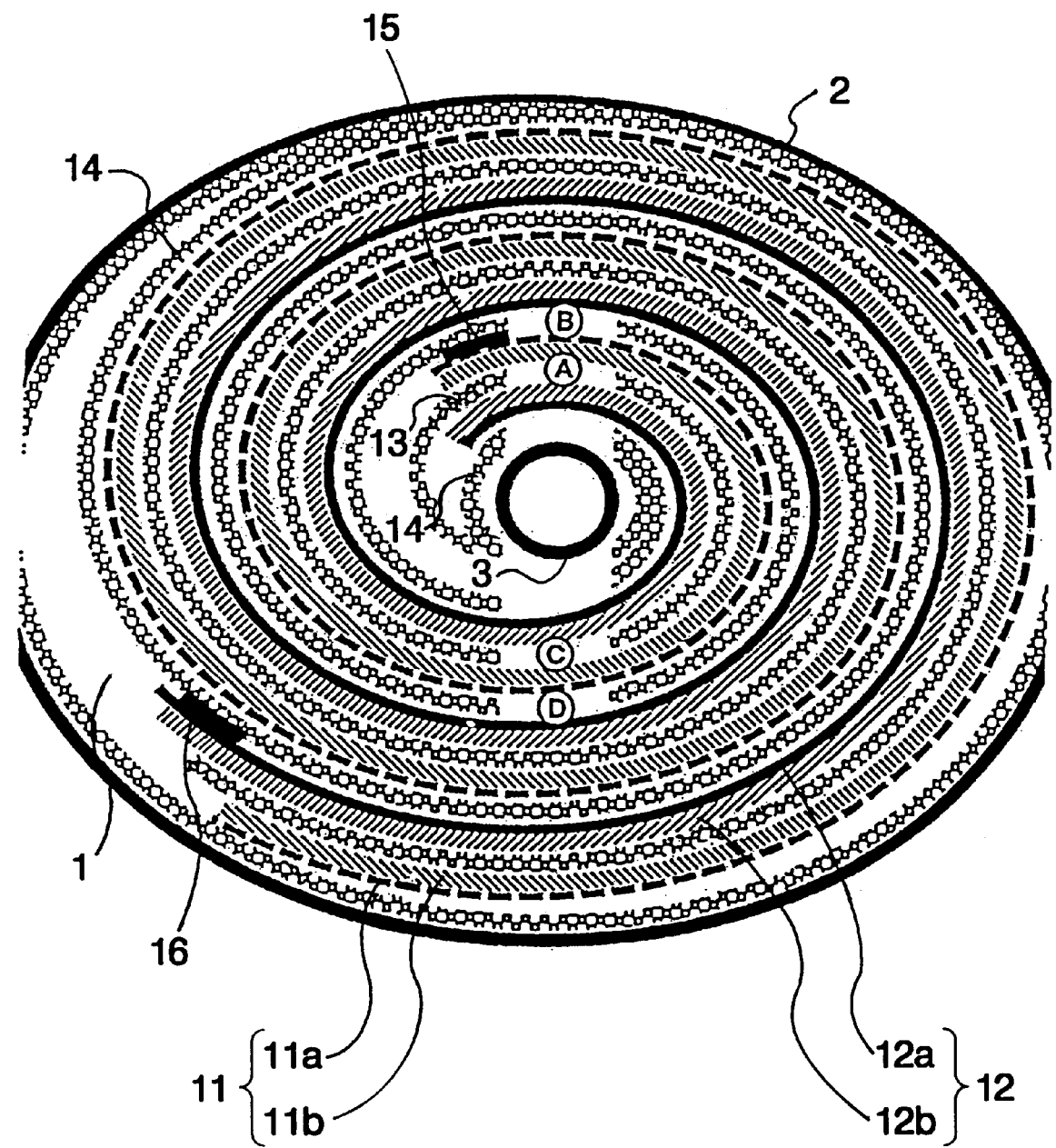
FIG. 2 is a cross sectional view illustrating the state of the battery of FIG. 1 when a crushing force is applied.

Referring to FIG. 2, in case that the battery is crushed in a heaping direction, the inner-most separator 13 and insulating film 14 close to the center core 3 generally receive the greatest stress. Breaking thus first occurs in the separator 13 and the insulating film 14 and is extended toward the outer circumference. This leads to a short circuit between the active material of positive electrode 11b and the active material of negative electrode 12b, for example, at positions B and C in FIG. 2. Substantially at the same time, a short circuit occurs between the collector foils 11a and 12a of the positive electrode and the negative electrode at positions A and D. This structure enables most of the electric current to flow through the collector foils 11a and 12a even in the short-circuited portions and to be safely discharged inside. This accordingly decreases the electric current flowing through the active material of positive electrode 11b containing $LiCoO_2$ and prevents an increase in temperature of $LiCoO_2$.

Even when a short circuit occurs in a charging state, this structure effectively inhibits evolution of oxygen caused by the increased temperature of $LiCoO_2$ and reactions of aluminum (the collector foil of the positive electrode) and an organic solvent (electrolytic solvent) with oxygen, thereby preventing a large energy from being produced inside the battery and ensuring the safety of the battery.

Figure 3:
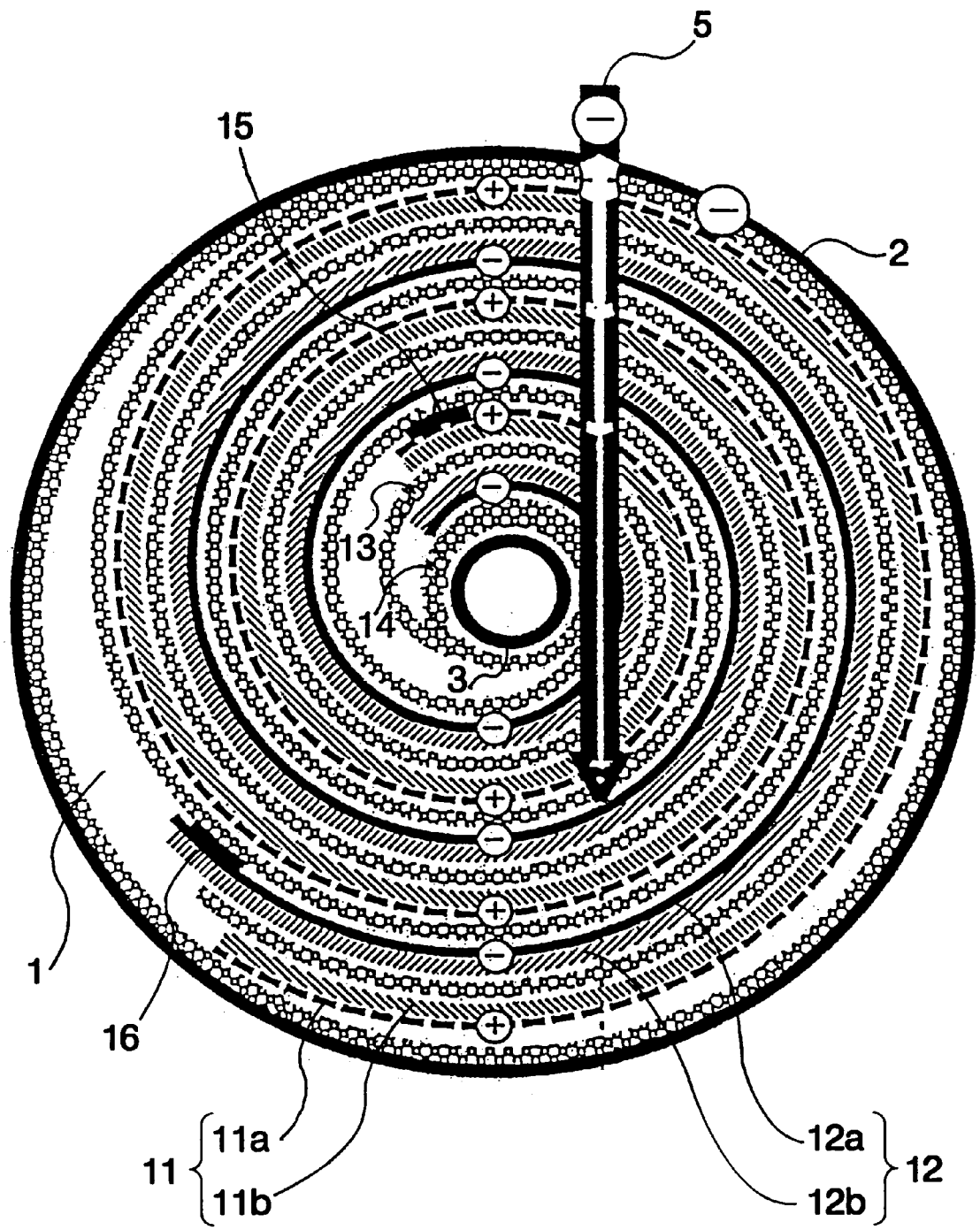
FIG. 3 is a cross sectional view illustrating the state of the battery of FIG. 1 when a sharp conductive member is pierced into the battery.

Referring to FIG. 3, in case that a sharp conductive member 5, such as a nail, is pierced into the battery casing 2 and enters the inside of the battery, the point of the conductive member 5 that has become a negative electrode when passing through the battery casing 2 successively passes through and comes into contact with the insulating film 14, the collector foil 11a of the positive electrode, the active material of positive electrode 11b, the separator 13, the active material of negative electrode 12b, the collector foil 12a of the negative electrode, the insulating film 14, and so on in this sequence. At this moment, a short circuit occurs between the active material of positive electrode 11b and the active material of negative electrode 12b across the conductive member 5. As discussed above, substantially at the same time, a short circuit also occurs between the collector foils 11a and 12a of the positive electrode and the negative electrode. This structure enables most of the electric current to flow through the collector foils 11a and 12a even in the short-circuited portions and to be safely discharged inside. Even when a short circuit occurs in a charging state, this structure effectively prevents a large energy from being produced inside the battery and ensures the safety of the battery.

In case that the conductive member 5, such as a nail, is pierced into the battery casing 2 but does not reach the center core 3, the conductive member 5 comes into contact with the collector foil 11a of the positive electrode prior to contact with the active material of positive electrode 11b. Even in short-circuited portions, most of the electric current thus flows through the collector foil 11a of the positive electrode, whereas substantially no electric current flows through the active material of positive electrode 11b. The battery has desirable safety especially when the sharp conductive member 5, such as a nail, is pierced to a little extent in the heaping direction.

In the first embodiment, the insulating film 14 disposed between the unit cell laminates 4 (that is, between the collector foil 11a of the positive electrode and the collector foil 12a of the negative electrode) is composed of the same membrane as that of the separator 13. This structure ensures the safety of the battery since no cell reactions take place between the unit cell laminates 4, but a decrease in electric capacity is inevitable. In case that the positive plate and the negative plate of the above structure and of the conventional structure are wound by a fixed length, the battery of the first embodiment has only half the capacity of the conventional battery. Since the active materials are applied only on the single faces of the positive electrode and the negative electrode, even in case that the winding length of the positive electrode and the negative electrode of the above structure is greater than the same of the conventional structure, the battery of the first embodiment does not have the capacity of the same level as that of the conventional battery.

Figure 4:
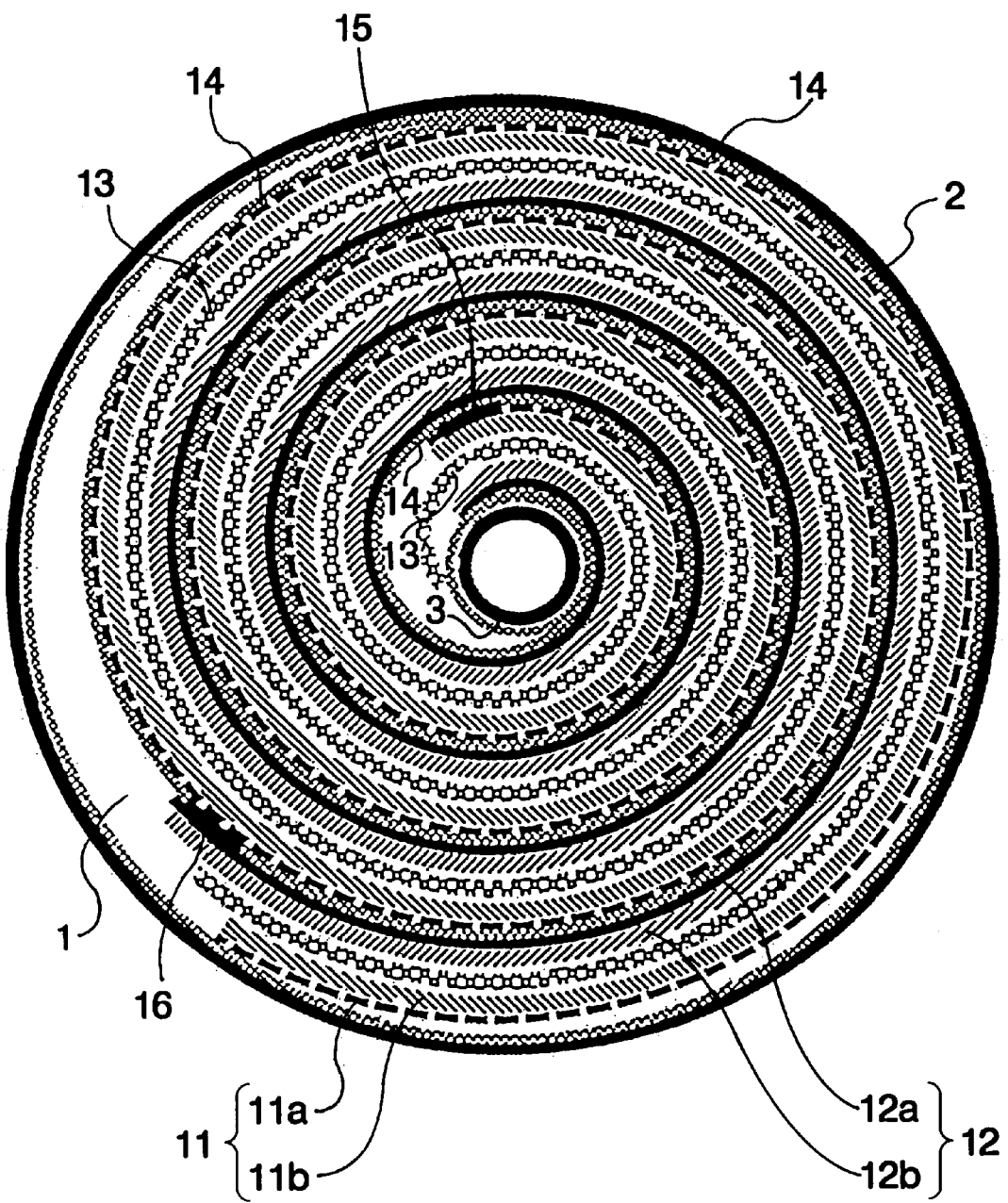
FIG. 4 is a cross sectional view illustrating a non-aqueous battery having a spirally-wound type laminate of electrode plates as a second embodiment according to the present invention.

Referring to FIG. 4, when the insulating film 14 is composed of a membrane having a less thickness than that of the separator 13, a greater length of the unit cell laminates 4 can be wound in the battery casing 2 of a fixed size. This structure desirably increases the electric capacity while ensuring the safety of the battery. By way of example, whereas the membrane of the separator 13 generally has the thickness of 25 to 35 $\mu$m, an insulating membrane of 12 $\mu$m in thickness (for example, polypropylene resin membrane) is applied for the insulating film 14. This increases the initial capacity by approximately 8 to 10% when the battery casing 2 has a diameter of 18 mm and a height of 65 mm.

In the battery of the first embodiment, the battery casing 2 and the positive plate 11 face each other across the insulating film 14. When the insulating film 14 has an ion-conductive function, charging and discharging may occur between the positive plate 11 and the battery casing 2 functioning as the negative electrode. This may result in deposit of metal lithium on the battery casing 2 in the charging state and dissolution of the material of the battery casing 2 in the over discharging state. The membrane having no ion-conductive function, for example, a polypropylene resin membrane, is thus used as the insulating film 14. This effectively prevents deposit of metal lithium on the battery casing 2 in the charging state and dissolution of the material of the battery casing 2 in the over discharging state.

It is preferable that the material of the insulating film 14 has a lower melting point than that of the separator 13. In case that an abnormal heat is externally applied to the battery, this structure enables the insulating film 14 to be fused prior to the separator 13. A short circuit between the collector foils 11a and 12a of the positive electrode and the negative electrode facing each other across the insulating film 14 accordingly occurs prior to a short circuit between the active material of positive electrode 11b and the active material of negative electrode 12b facing each other across the separator 13. This enables the short-circuiting current not to flow through the active material of positive electrode 11b but to flow only through the collector foils 11a and 12a. When the melting point of the insulating film 14 is lower than the melting point of the separator 13, the structure of the above embodiment ensures desirable safety in case that an abnormal heat is externally applied to the battery.

Figure 15:
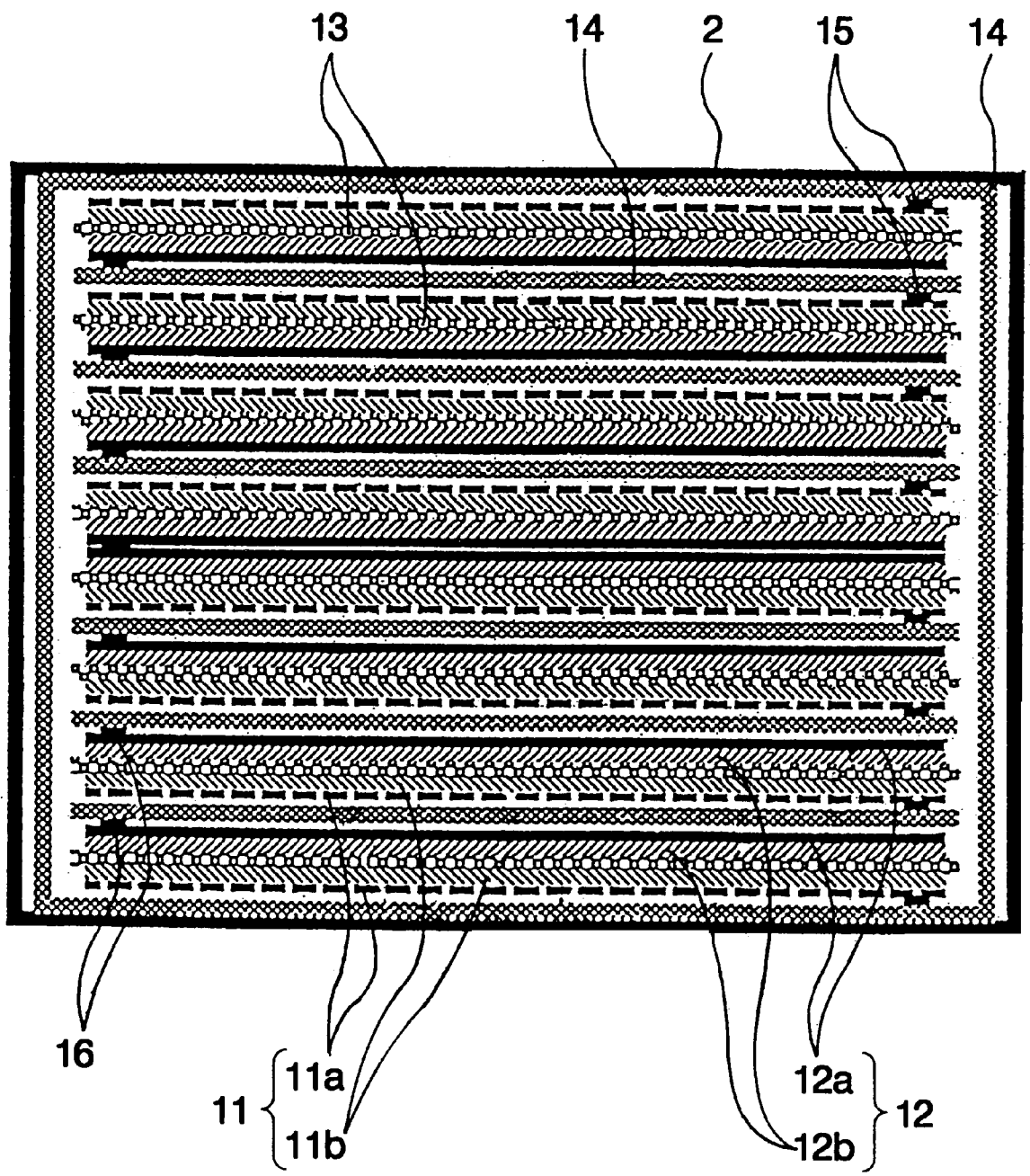
FIG. 15 is a cross sectional view illustrating a non-aqueous battery having a simple stacked type laminate of electrode plates according to the resent invention.
Figure 16:
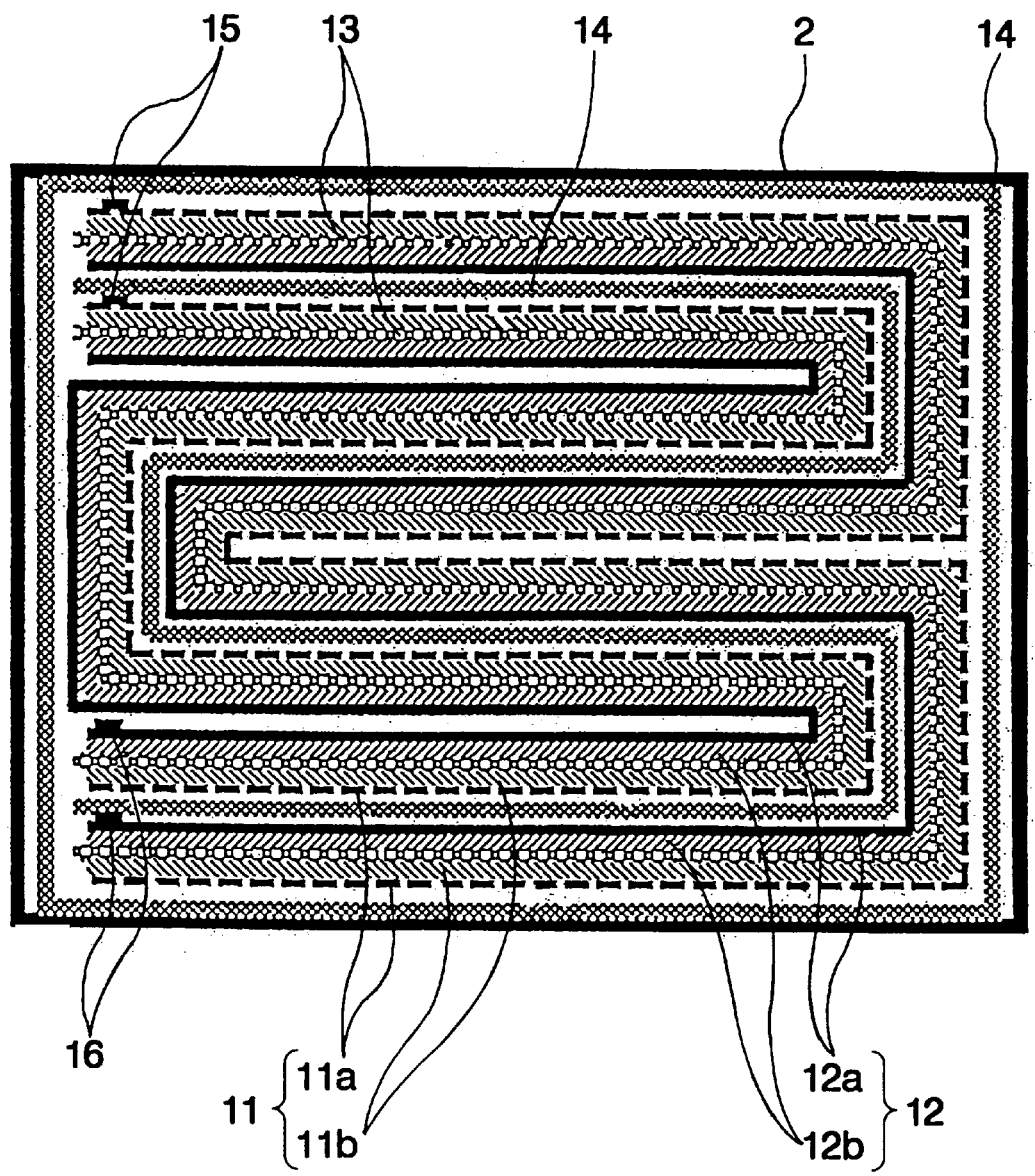
FIG. 16 is a cross sectional view illustrating a on-aqueous battery having a zigzag-folded type laminate of electrode plates according to the present invention.

The battery of the first embodiment includes the spirally-wound type laminate of electrode plates 1 obtained by laying the unit cell laminate 4, which consists of the negative plate 12, the separator 13, and the positive plate 11, and the insulating film 14 one upon the other in the above manner and winding the layers in a spiral form with a winding machine. The laminate of electrode plates in the battery of the present invention may, however, be the simple stacked type, wherein the unit cell laminates 4 are laid one upon another and parallel to one another across the insulating films 14 as shown in FIG. 15, or the zigzag-folded type, wherein the layers of the unit cell laminates 4 and the insulating films 14 are folded at predetermined widths to be arranged in parallel as shown in FIG. 16.

Although the first embodiment regards the lithium-ion secondary battery, the principle of the present invention is also applicable to other non-aqueous secondary batteries and non-aqueous primary batteries having the active material of relatively high durability, in order to ensure the safety of such batteries.

Figure 5:
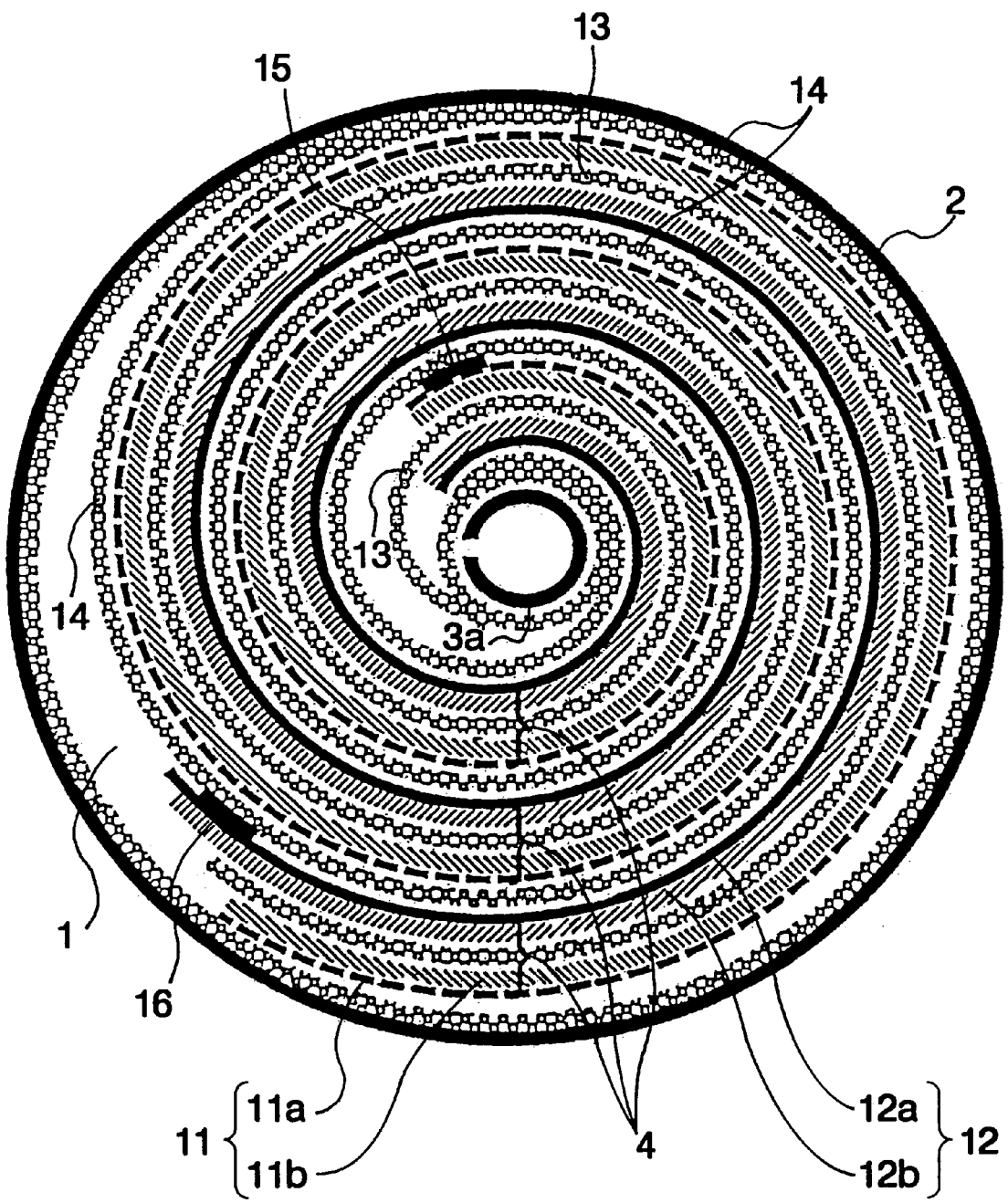
FIG. 5 is a cross sectional view illustrating a non-aqueous battery having a spirally-wound type laminate of electrode plates as a third embodiment according to the present invention.
Figure 6:
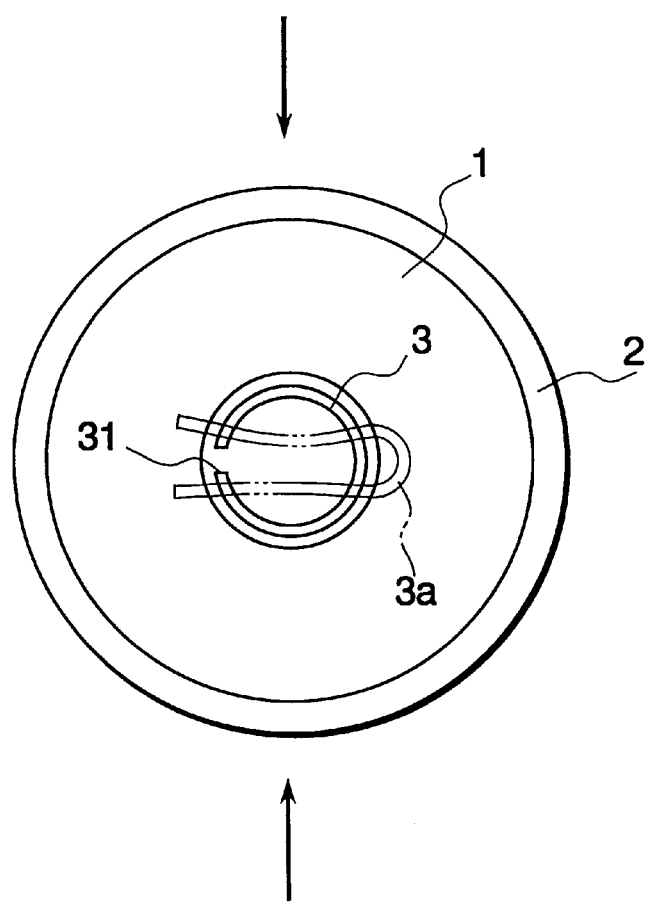

FIG. 5 is a cross sectional view illustrating another non-aqueous battery with a second center core 3a inserted therein, in place of the center core 3 of the first embodiment shown in FIG. 1. The center core 3a is a hollow cylindrical body having a cut-out portion 31 of a predetermined width (for example, 0.3 mm in the cylindrical body of 4.0 mm in outer diameter and 0.4 mm in thickness) extending in the axial direction on the circumferential surface thereon. In case that the battery is crushed in a heaping direction, as shown by the phantom line in FIG. 6, the center core 3a is crushed to open the edges of the cut-out portion 31 outward and break the laminate of electrode plates 1 from the inner circumferential side. This accelerates the short circuit between the collector foils 11a and 12a of the positive electrode and the negative electrode and expands the range of short circuits.

Figure 7:
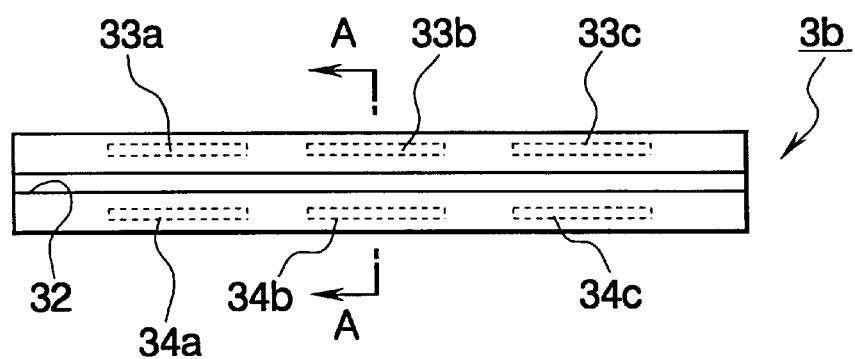
FIG. 7 is a front view illustrating a third center core 3b.
Figure 8:
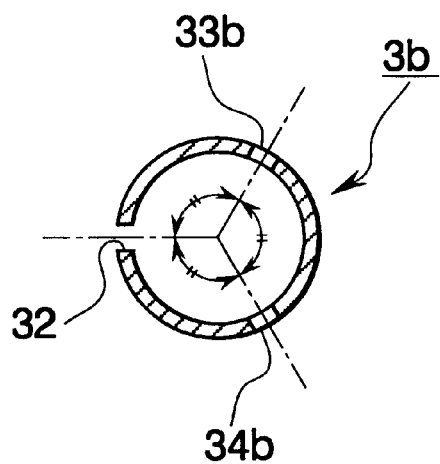
FIG. 8 is a sectional view taken on the line A—A of FIG. 7.

FIG. 7 is a front view illustrating a third center core 3b, and FIG. 8 is a sectional view taken on the line A—A of FIG. 7. FIG. 8 clearly shows the function of the center core 3b.

The center core 3b is composed of stainless steel, for example, SUS304. As shown in FIGS. 7 and 8, the center core 3b is a hollow cylindrical body having a split opening 32 of a predetermined width (for example, 0.3 mm in the cylindrical body of 4.0 mm in outer diameter and 0.4 mm in thickness) that extends in the axial direction on the circumferential surface thereof, like the cut-out portion 31, as well as slits 33a through 33c and 34a through 34c of the predetermined width that extend in the axial direction but do not reach the end face of the cylindrical body.

The slits 33a through 33c are arranged in series at predetermined intervals along one straight line parallel to the axis, whereas the slits 34a through 34c are arranged in series at predetermined intervals along another straight line parallel to the axis. The split opening 32, the slits 33a through 33c, and the slits 34a through 34c are arranged to divide the circumference of the circular cross section of the center core 3b into three equal portions.

In case that the battery of FIG. 1 having the center core 3b is crushed in a heaping direction, the center core 3b is crushed to open the edges of the split opening 32 and the slits 33a through 33c and 34a through 34c outward and break the laminate of electrode plates 1 from the inner circumferential side. This accelerates the short circuit and expands the range of short circuits.

Figure 9:
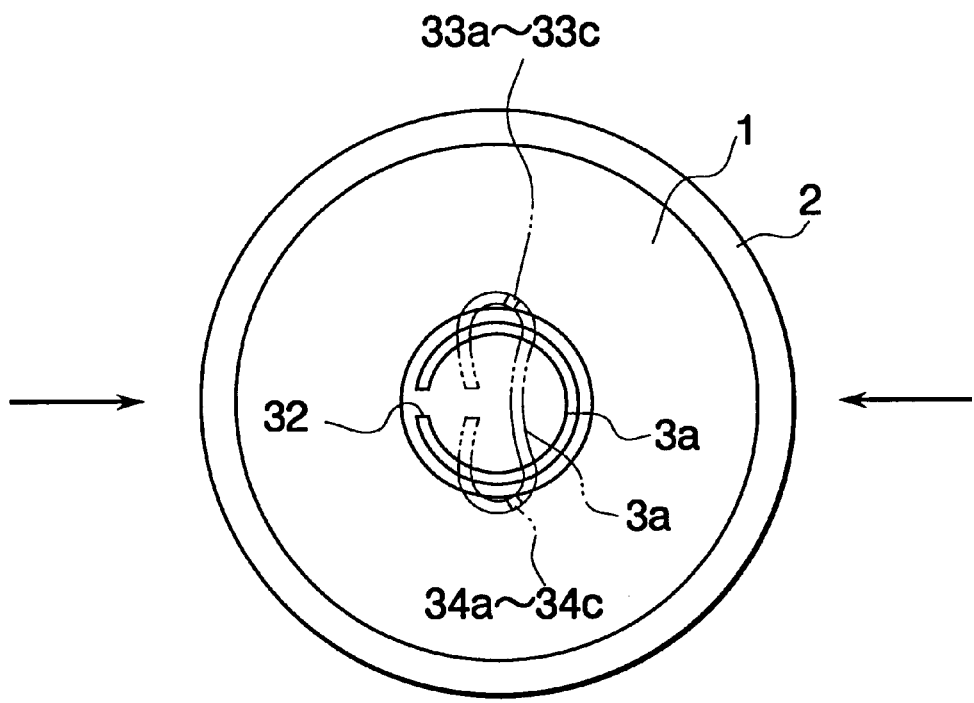
FIG. 9 shows the functions of the center core 3b.

Especially when the crushing direction of the battery coincides with one of the cut-out portions of the center core 3b (the split opening 32 in this example) as shown by the phantom line in FIG. 9, the edges of the split opening 32 are pressed inward and do not break the laminate of electrode plates 1, while the edges of the slits 33a through 33c and 34a through 34c open outward. This structure enables the laminate of electrode plates 1 to be securely broken irrespective of the crushing direction. Compared with the center core 3a, the center core 3b causes a greater number of short circuits in the circumferential direction of the laminate of electrode plates 1.

Figure 10:
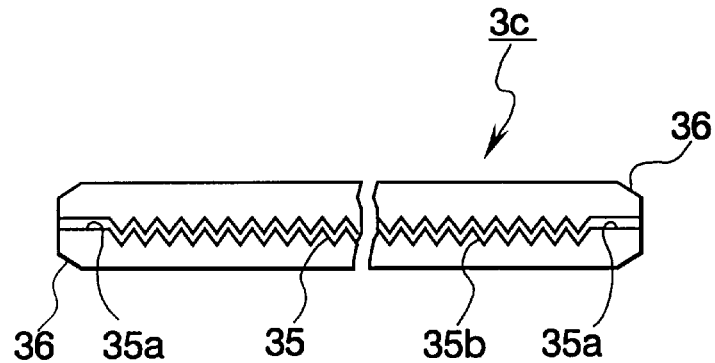
FIG. 10 is a front view illustrating a fourth center core 3c.

FIG. 10 is a front view illustrating a fourth center core 3c. As clearly seen in this drawing, the center core 3c corresponds to the center core 3a with the cut-out portion 31 having the triangular-waved edges except both ends in the longitudinal direction. A cut-out portion 35 of the center core 3c includes parallel sections 35a formed on both ends in the longitudinal direction and a central waved section 35b. The center core 3c also has tapered sections 36 on both ends in the longitudinal direction, in order to allow the center core 3c to be readily inserted into the winding center of the laminate of electrode plates 1. The diameter of each tapered section 36 decreases toward the corresponding end.

When the center core 3c is crushed by the crushing force applied to the laminate of electrode plates 1 in a heaping direction, the edges of the waved section 35b opened outward form a serrated protrusion. This enables the laminate of electrode plates 1 to be more readily broken and better disperses the broken positions than the structure of the first embodiment.

Figure 11:
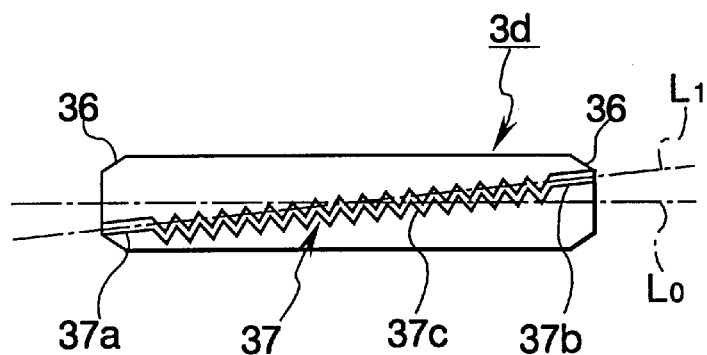
FIG. 11 is a front view illustrating a fifth center core 3d.
Figure 12:
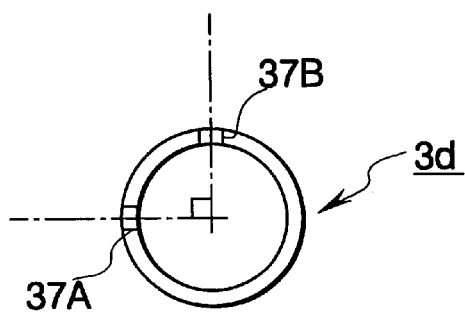
FIG. 12 shows a cut-out portion of the fifth center core 3d.

FIG. 11 is a front view illustrating a fifth center core 3d. As clearly seen in this drawing, the center core 3d is a cylindrical body having a spiral cut-out portion 37 that is formed on the circumferential surface of the cylindrical body to extend in a direction L1 (actually in a spiral form) obliquely intersecting an axial direction L0 of the cylindrical body and run from one end to the other end in the longitudinal direction. The spiral cut-out portion 37 includes parallel sections 37a and 37b formed on both ends in the longitudinal direction to be parallel to the direction L1, and a central waved section 37c having triangular-waved edges. As shown in FIG. 12, the spiral of the cut-out portion 37 is formed to rotate by 90 degrees between one end 37A and the other end 37B in the longitudinal direction. The center core 3d also has tapered sections 36 on both ends in the longitudinal direction, in order to allow the center core 3d to be readily inserted into the winding center of the laminate of electrode plates 1. The diameter of each tapered section 36 decreases toward the corresponding end.

When the center core 3d is crushed by the crushing force applied to the laminate of electrode plates 1 in a heaping direction, the edges of the cut-out portion 37 are opened outward irrespective of the crushing direction that intersects the axis, thereby enabling the laminate of electrode plates 1 to be securely broken. The edges of the waved section 37c opened outward form a serrated protrusion. This enables the laminate of electrode plates 1 to be more readily broken and better disperses the broken positions. Compared with the structure having a plurality of cut-out portions that are arranged in the circumferential direction and extend in the axial direction, this structure is effective for the crushing force applied in any direction intersecting the axis, while decreasing the opening area on the circumferential surface. The center core of less thickness can accordingly hold the required strength in the ordinary state.

Figure 13:
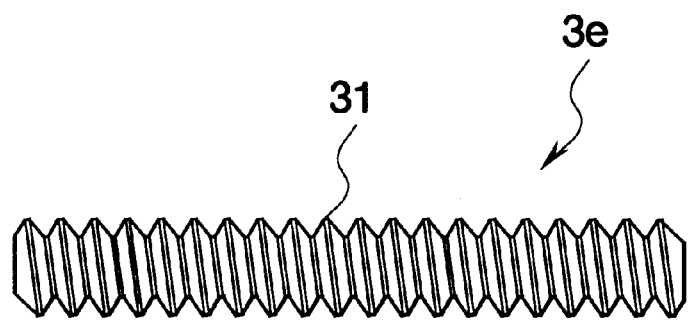
FIG. 13 is a front view illustrating a sixth center core 3e.

FIG. 13 is a front view illustrating a sixth center core 3e. The center core 3e is a solid screwed shaft having the diameter of approximately 4 mm and the pitch of 0.7 mm and has a spiral recess 31 formed on the circumferential surface thereof. The depth of the recess 31 ((diameter of the thread crest—diameter of the thread bottom)/2) is approximately 0.5 mm.

When the battery is crushed in a heaping direction, the inner circumferential side of the laminate of electrode plates 1 is cut into the recess 31 of the center core 3d and broken extensively.

Figure 14:
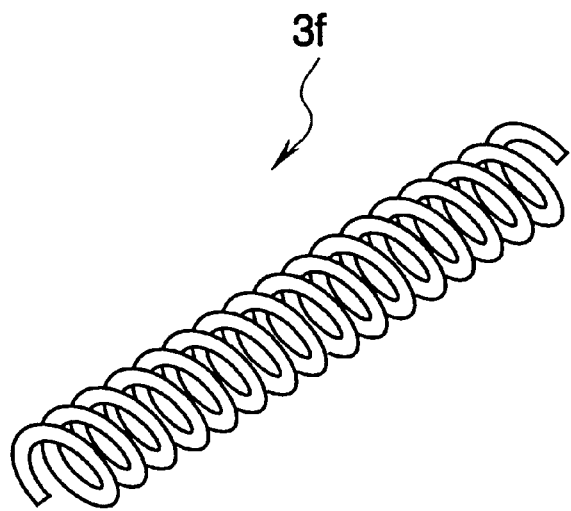
FIG. 14 is a perspective view illustrating a seventh center core 3f.

FIG. 14 is a perspective view illustrating a seventh center core 3f. The center core 3f is a stainless steel coiled spring that is composed of wires of circular cross section, wherein the diameter of the wires and the pitch are respectively 0.6 mm and 1.6 mm. There is a clearance of 1.0 mm between the adjoining wires in a non-loading condition.

When the battery is crushed in a heaping direction, the inner circumferential portion of the laminate of electrode plates 1 is pressed against the circumferential surface of the coiled spring 3f. The coiled spring 3f is crushed and extends in the axial direction to be inclined in the laminate of electrode plates 1 (that is, the center axis of the coiled spring 3f is deacrossted from the winding center), while the inner circumferential portion of the laminate of electrode plates 1 is cut into the clearance between the adjoining wires. This enables the laminate of electrode plates 1 to be extensively broken from the inner circumferential side.

FIG. 15 is a cross sectional view illustrating a non-aqueous battery having a simple stacked type laminate of electrode plates according to the present invention; and FIG. 16 is a cross sectional view illustrating a non-aqueous battery having a zigzag-folded type laminate of electrode plates according to the present invention. The numerals appearing in FIGS. 15 and 16 refer to the same materials as shown in FIG. 1.

FIELD OF INDUSTRIAL APPLICATIONS

As discussed above, the non-aqueous battery of the present invention can effectively prevent an abrupt increase in internal temperature even when a short circuit occurs between an active material of positive electrode and a negative electrode due to external application of an abnormal heat, a crush of the battery in a heaping direction, or a pierced nail in an overchargin state, thereby ensuring the safety of the battery.

What is claimed is:

1. A non-aqueous battery having a unit cell laminate, which comprises:
    a battery casing having arranged therein:
        a positive plate comprising a collector foil for a positive electrode and an active material of said positive electrode only on a single face of said collector foil for said positive electrode,
        a negative plate comprising a collector foil for a negative electrode and an active material of said negative electrode only on a single face of said collector foil for said negative electrode,
        an insulating film, and
        a separator;
        wherein the single face of said positive plate with said active material of the positive electrode and the single face of said negative plate with said active material of the negative electrode are arranged to face each other across said separator, and the other face of said positive plate without said active material of the positive electrode and the other face of said negative plate with said active material of the negative electrode are arranged to face each other across the insulating film.

2. A non-aqueous battery as claimed in claim 1, wherein said positive plate is arranged to face said battery casing functioning as a negative terminal across said insulating film.

3. A non-aqueous battery as claimed in claim 1 or 2, wherein said insulating film has neither electron-conductive function nor ion-conductive function.

4. A non-aqueous battery as claimed in claim 1 or 2, wherein said insulating film has a less membrane thickness than a membrane thickness of said separator.

5. A non-aqueous battery as claimed in claim 1 or 2, wherein said insulating film has a lower melting point than a melting point of said separator.

6. A non-aqueous battery as claimed in claim 1, wherein said positive plate has said active material of positive electrode applied on the whole single face of said collector foil, and said negative plate has said active material of negative electrode applied on the whole single face of said collector foil.

7. A non-aqueous battery as claimed in claim 6, wherein a plurality of said unit cell laminates are wound and laid one upon another across a plurality of said insulating films.

8. A non-aqueous battery as claimed in claim 7, said non-aqueous battery being a secondary battery.

9. A non-aqueous battery as claimed in claim 8, wherein said positive plate is arranged to face said battery casing functioning as a negative terminal across said insulating film.

10. A non-aqueous battery as claimed in claim 7 or 8, wherein said insulating film has a less membrane thickness than a membrane thickness of said separator.

11. A non-aqueous battery as claimed in claim 7 or 8, wherein said insulating film has a lower melting point than a melting point of said separator.

12. A non-aqueous battery as claimed in claim 7 or 8, wherein the plurality of said unit cell laminates are wound around a center core.

13. A non-aqueous battery as claimed in claim 12, wherein said center core comprises a columnar body having a cut-out portion formed on a circumferential surface thereof.

14. A non-aqueous battery as claimed in claim 13, wherein said center core has at least two cut-out portions formed in parallel to an axis of said columnar body.

15. A non-aqueous battery as claimed in claim 13, wherein said cut-out portion is formed in a direction intersecting an axial direction of said columnar body.

16. A non-aqueous battery as claimed in claim 12, wherein said center core comprises a rod member having a continuous recess formed in a circumferential direction on a circumferential surface thereof.

17. A non-aqueous battery as claimed in claim 12, wherein said center core comprises a coiled spring.

18. A non-aqueous battery as claimed in claim 13, wherein said cut-out portion has waved edges.

19. A non-aqueous battery as claimed in claim 14, wherein said cut-out portion has waved edges.

20. A non-aqueous battery as claimed in claim 15, wherein said cut-out portion has waved edges.

* * * * *